United States Patent
Lee et al.

(10) Patent No.: US 11,191,094 B2
(45) Date of Patent: Nov. 30, 2021

(54) METHOD FOR TRANSMITTING OR RECEIVING SIGNAL IN WIRELESS COMMUNICATION SYSTEM AND APPARATUS THEREFOR

(71) Applicant: LG ELECTRONICS INC., Seoul (KR)

(72) Inventors: Sangrim Lee, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 16/480,983

(22) PCT Filed: Feb. 5, 2018

(86) PCT No.: PCT/KR2018/001500
§ 371 (c)(1),
(2) Date: Jul. 25, 2019

(87) PCT Pub. No.: WO2018/147607
PCT Pub. Date: Aug. 16, 2018

(65) Prior Publication Data
US 2020/0008220 A1 Jan. 2, 2020

Related U.S. Application Data

(60) Provisional application No. 62/521,539, filed on Jun. 19, 2017, provisional application No. 62/505,140, (Continued)

(51) Int. Cl.
*H04W 72/12* (2009.01)
*H04L 5/00* (2006.01)
(Continued)

(52) U.S. Cl.
CPC .......... *H04W 72/1268* (2013.01); *H04L 1/08* (2013.01); *H04L 5/0007* (2013.01);
(Continued)

(58) Field of Classification Search
CPC ....... H04W 72/1268–14; H04W 76/14; H04W 76/23; H04W 88/04; H04W 4/70–80; H04W 74/004–008; H04L 5/0092–0096
See application file for complete search history.

(56) References Cited

U.S. PATENT DOCUMENTS

2012/0039278 A1   2/2012  Park et al.
2013/0003678 A1*  1/2013  Quan ................... H04W 72/04
                                                   370/329
(Continued)

OTHER PUBLICATIONS

R1-1702234: 3GPP TSG RAN WG1 Meeting #88, Athens, Greece, Feb. 13-17, 2017, Intel Corporation, "Scheduling request design for NR," pp. 1-5.
(Continued)

*Primary Examiner* — Marcus Smith
(74) *Attorney, Agent, or Firm* — Dentons US LLP

(57) ABSTRACT

A method for transmitting, by a terminal, an uplink signal in a wireless communication system according to one embodiment of the present disclosure comprises the steps of: receiving, from a base station, scheduling request (SR) resource information and data resource information; transmitting an SR through any one of a UE-wise SR resource and a group-wise SR resource allocated through the SR resource information; and repeatedly transmitting uplink data through a plurality of resource areas allocated through the data resource information, wherein one UE-wise SR resource may be allocated to each first resource area set consisting of N resource areas, and at least one group-wise SR resource may be allocated to each resource area. The UE is capable of communicating with at least one of another UE, a UE related to an autonomous driving vehicle, a base station or a network.

11 Claims, 18 Drawing Sheets

Related U.S. Application Data filed on May 12, 2017, provisional application No. 62/457,181, filed on Feb. 10, 2017.

(51) Int. Cl.
  *H04W 72/14*   (2009.01)
  *H04L 1/08*   (2006.01)

(52) U.S. Cl.
  CPC ....... *H04L 5/0037* (2013.01); *H04W 72/1284* (2013.01); *H04W 72/14* (2013.01)

(56) References Cited

U.S. PATENT DOCUMENTS

| | | |
|---|---|---|
| 2013/0163536 A1 | 6/2013 | Anderson et al. |
| 2018/0070335 A1* | 3/2018 | Amuru ................. H04L 5/0091 |
| 2018/0123765 A1* | 5/2018 | Cao ....................... H04L 1/1822 |
| 2018/0124830 A1* | 5/2018 | Lin ........................ H04W 8/005 |
| 2018/0199359 A1* | 7/2018 | Cao ....................... H04L 5/0012 |
| 2019/0174472 A1* | 6/2019 | Lee .................... H04W 72/042 |

OTHER PUBLICATIONS

R1-1612138: 3GPP TSG RAN WG1 Meeting #87, Reno, USA Nov. 14-18, 2016, MediaTek Inc., "On contentions-based SR and uplink data transmission," pp. 1-5.

R1-1701964: 3GPPTSG RAN WG1 Meeting 88, Athens, Greece, Feb. 13-17, 2017, Guangdong OPPO Mobile Telecom, "Discussion on the SR Enhancement for the URLLC," pp. 1-2.

\* cited by examiner

METHOD FOR TRANSMITTING OR RECEIVING SIGNAL IN WIRELESS COMMUNICATION SYSTEM AND APPARATUS THEREFOR

This application is a 35 USC § 371 National Stage entry of International Application No. PCT/KR2018/001500, filed on Feb. 5, 2018, which claims priority to U.S. Provisional Application No. 62/457,181, filed on Feb. 10, 2017, U.S. Provisional Application No. 62/505,140, filed on May 12, 2017, and U.S. Provisional Application No. 62/521,539, filed on Jun. 19, 2017, all of which are incorporated by reference in their entirety herein.

TECHNICAL FIELD

The present disclosure relates to a wireless communication system, and more particularly to, methods of transmitting and receiving uplink signals between a user equipment and a base station and devices therefor.

BACKGROUND ART

As a number of communication devices have required much higher communication capacity, scenarios for the next generation communication system (e.g., 5G or new RAT) have been discussed in recent years. For example, Enhanced Mobile BroadBand (eMBB), Ultra-reliable Machine-Type Communications (uMTC), and Massive Machine-Type Communications (mMTC) are included in the scenarios. The eMBB corresponds to a next generation mobile communication scenario characterized by high spectrum efficiency, high user experienced data rates, high peak data rates, etc. The uMTC corresponds to a next generation mobile communication scenario characterized by ultra-high reliability, ultra-low latency, ultra-high availability, etc. For example, the uMTC may include V2X, emergency services, remote control, etc. The mMTC corresponds to a next generation mobile communication scenario characterized by low cost, low energy, short packets, massive connectivity, etc. For example, the mMTC may include Internet of Things (IoT).

FIG. 1 illustrates relation between core performance requirements for 5G, which are proposed in IMT 2020, and 5G performance requirements for each service scenario. In particular, uMTC services have extremely restricted Over-The-Air (OTA) latency requirements and requires high mobility and reliability (e.g., OTA Latency<1 ms, Mobility>500 km/h, and BLER<$10^{-6}$).

For the next generation wireless communication, new Radio Access Technology (RAT) considering the eMBB, mMTC, URLCC, etc. has been discussed.

DISCLOSURE

Technical Problem

An object of the present disclosure devised to solve the problem lies on a method for more accurately and efficiently performing contention-based signal transmission and reception and an apparatus therefor.

Objects of the present disclosure are not limited by the above-mentioned object, and other objects can be clearly understood from the embodiments of the present disclosure.

Technical Solution

The object of the present disclosure can be achieved by providing a method for transmitting an uplink signal by a user equipment (UE) in a wireless communication system, the method including receiving scheduling request (SR) resource information and data resource information from a base station, transmitting an SR through one of a UE-wise SR resource and a group-wise SR resource allocated through the SR resource information, and repeatedly transmitting uplink data through a plurality of resource zones allocated through the data resource information, wherein one UE-wise SR resource is allocated to each resource zone set including N resource zones, and at least one group-wise SR resource is allocated to each of the resource zones.

In another aspect of the present disclosure, provided herein is a method for receiving an uplink signal by a base station in a wireless communication system, the method including transmitting scheduling request (SR) resource information and data resource information to a user equipment (UE), receiving an SR through one of a UE-wise SR resource and a group-wise SR resource allocated through the SR resource information, and repeatedly receiving uplink data through a plurality of resource zones allocated through the data resource information, wherein one UE-wise SR resource is allocated to each resource zone set including N resource zones, and at least one group-wise SR resource is allocated to each of the resource zones.

In another aspect of the present disclosure, provided herein is a user equipment (UE) for transmitting an uplink signal in a wireless communication system, including a transmitter, a receiver, and a processor configured to receive scheduling request (SR) resource information and data resource information from a base station using the receiver, to transmit an SR through one of a UE-wise SR resource and a group-wise SR resource allocated through the SR resource information using the transmitter, and to repeatedly transmit uplink data through a plurality of resource zones allocated through the data resource information using the transmitter, wherein one UE-wise SR resource is allocated to each resource zone set including N resource zones, and at least one group-wise SR resource is allocated to each of the resource zones.

In another aspect of the present disclosure, provided herein is a base station for receiving an uplink signal in a wireless communication system, including a transmitter, a receiver, and a processor configured to transmit scheduling request (SR) resource information and data resource information to a user equipment (UE) using the transmitter, to receive an SR through one of a UE-wise SR resource and a group-wise SR resource allocated through the SR resource information using the receiver, and to repeatedly receive uplink data through a plurality of resource zones allocated through the data resource information, wherein one UE-wise SR resource is allocated to each resource zone set including N resource zones, and at least one group-wise SR resource is allocated to each of the resource zones.

The UE may select one of the UE-wise SR resource and the group-wise SR resource based on a time when the uplink data is generated.

When the UE selects the UE-wise SR resource and transmits the SR, repeated transmission of the data may be started from a start time of the resource zone set.

When the UE selects the group-wise SR resource and transmits the SR, repeated transmission of the data may be started from a resource zone associated with the group-wise SR resource in the resource zone set, the SR being transmitted on the group-wise SR resource.

The UE may receive, from the base station, information indicating one of a non-staggering mode and a staggering mode, wherein start and end times of the repeated transmission are matched with start and end times of the resource zone set in the non-staggering mode, and do not need to be matched with the start and end times of the resource zone set in the staggering mode.

According to the start and end times of the repeated transmission of the UE may be configured to be the same as other UEs, wherein, according to the staggering mode, the start and end times of the repeated transmission of the UE may be configured independently from the other UEs.

Advantageous Effects

According to an embodiment of the present disclosure, a UE repeatedly transmits data after transmitting an SR through an SR resource allocated on a UE-by-UE basis or an SR resource allocated on a group-by-group basis. Thereby, contention-based signal transmission and reception may be performed accurately and efficiently.

Effects obtainable from the present disclosure are not limited by the above mentioned effect, and other unmentioned effects can be clearly understood from the embodiments of the present disclosure.

DESCRIPTION OF DRAWINGS

The accompanying drawings, which are included to provide a further understanding of the present disclosure, and are incorporated in and constitute a part of this specification, illustrate embodiments of the invention and together with the description serve to explain the principles of the invention.

MODE FOR CARRYING OUT THE INVENTION

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present disclosure may be non-limited. Specific terminologies used in the following description are provided to help understand the present disclosure and the use of the terminologies can be modified to a different form within a scope of the technical idea of the present disclosure.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
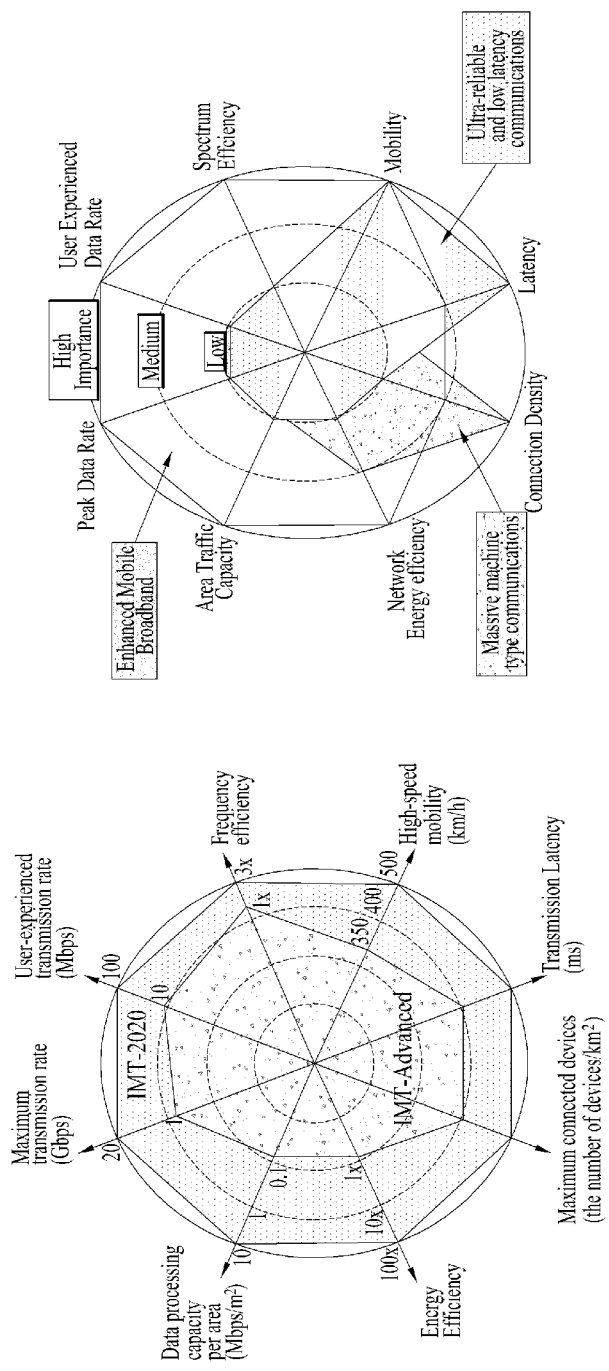
FIG. 1 illustrates a 5G service scenario and performance requirements thereof.
Figure 2:
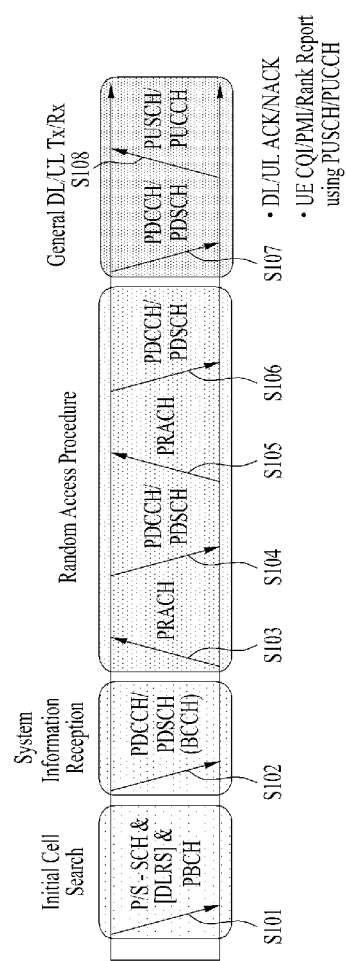
FIG. 2 illustrates physical channels used in the 3GPP LTE/LTE-A system and a general signal transmission method using the same.

FIG. 2 is a diagram for explaining an example of physical channels used for 3GPP LTE/LTE-A system and a general signal transmission method using the same.

Referring to FIG. 2, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Hereinafter, a contention-based random access procedure in the LTE system will be described in detail.

(1) Message 1 transmission: A User Equipment (UE) may randomly select one random access preamble from a random access preamble set indicated by system information or a handover command Thereafter, the UE may select Physical Random Access Channel (PRACH) resources and then transmit the random access preamble using the selected PRACH resources.

(2) Message 2 reception: After transmitting the random access preamble, the UE attempts to receive a random access response within a random access response reception window indicated through the system information or the handover command by an eNB. More specifically, the random access response may be transmitted in the form of a Medium Access Control Protocol Data Unit (MAC PDU), and the MAC PDU may be delivered over a Physical Downlink Shared Channel (PDSCH). To receive information on the PDSCH successfully, the UE needs to monitor a Physical Downlink Control Channel (PDCCH). That is, a PDCCH preferably includes information on a UE to receive the PDSCH, information on time and frequency radio resources of the PDSCH, and information on a transmission format of the PDSCH. Once the UE succeeds in receiving the PDCCH destined therefor, the UE may successfully receive the random access response over the PDSCH according to information included in the PDCCH. The random access response may include an identifier (ID) of the random access preamble (e.g., a Random Access Preamble ID (RAPID)), an Uplink (UL) grant indicating UL radio resources, a temporary Cell-Radio Network Temporary Identifier (C-RNTI), and a Timing Advance Command (TAC).

(3) Message 3 transmission: Upon receiving a valid random access response, the UE processes information included in the random access response. That is, the UE applies the TAC and stores the temporary C-RNTI. In addition, the UE may store data to be transmitted in response to the received valid random access response in a message 3 buffer. Meanwhile, the UE transmits data (i.e. message 3) to the eNB using the received UL grant. Message 3 should include an ID of the UE. This is because in the contention-based random access procedure, the eNB cannot identify which UE performs the random access procedure but the eNB should identify the UEs to avoid a collision later.

(4) Message 4 reception: After transmitting the data including its ID based on the UL grant included in the random access response, the UE awaits reception of a command for contention resolution from the eNB. That is, the UE attempts to receive a PDCCH to receive a specific message. If the UE receives the PDCCH using its C-RNTI, the UE terminates the random access procedure after determining that the random access procedure has been performed normally.

Figure 3:
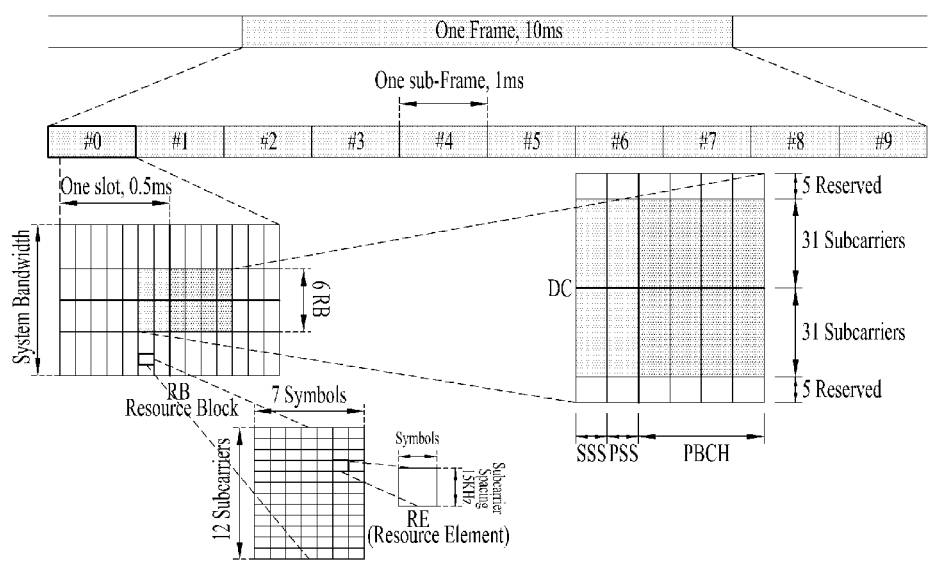
FIG. 3 illustrates the structure of a radio frame of the 3GPP LTE/LTE-A system.

FIG. 3 is a diagram for explaining an example of a structure of a radio frame. Referring to FIG. 3, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

A frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference. When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel). That is, when normal CP is used, 1 RB is defined as 12 subcarriers with 15 kHz subcarrier spacing and 7 OFDM symbols.

6 RBs at the center frequency are used to transmit a Primary Synchronization Signal (PSS) and a Secondary Synchronization Signal (SSS), which are used to establish synchronization, and a Physical Broadcast Channel (PBCH) for system information transmission. The above-described frame structure, signals, and channel locations may vary depending on a normal/extended CP, TDD/FDD, etc.

Figure 4:
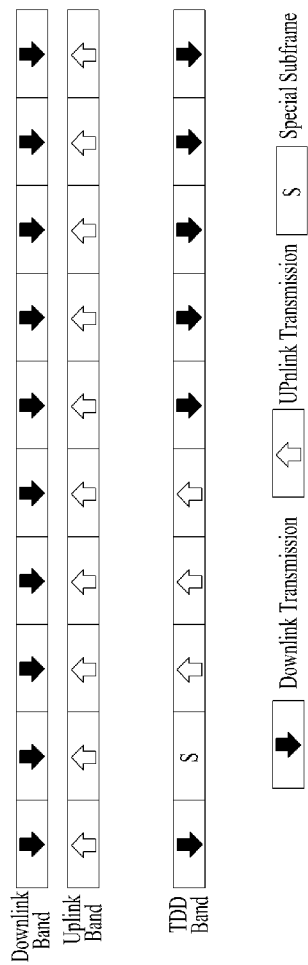
FIG. 4 illustrates Frequency Division Duplex (FDD) and Time Division Duplex (TDD) schemes of the 3GPP LTE/LTE-A system.

FIG. 4 illustrates FDD and TDD in the LTE/LTE-A system. Referring to FIG. 4, in the FDD, different frequency bands are used for DL and UL transmission, respectively. On the other hand, in the TDD, DL and UL regions are separated from each other on a subframe basis in the same frequency band.

Hereinafter, UL multiple access schemes of the LTE system will be described.

First, an SC-FDMA transmission scheme is explained. SC-FDMA may be referred to as Discrete Fourier Transform-spreading-Orthogonal Frequency Divisional Multiple Access (DFT-s-OFDMA). The SC-FDMA is an efficient transmission scheme capable of maintaining Peak-to-Average Power Ratio (PAPR) or a Cube Metric (CM) value at a low level and avoiding a non-linear distortion part of a power amplifier. The PAPR is a parameter representing waveform properties and obtained by dividing the peak value of waveform amplitude by a time-averaged root mean square (RMS) value. The CM is another measurement value representing the PAPR value. The PAPR is associated with a dynamic range which should be supported by a power amplifier at a transmitter. That is, to support transmission with a high PAPR value, the dynamic range (or a linear part) of the power amplifier needs to increase. Since the cost of the power amplifier increases as the dynamic range of the power amplifier increases, a transmission scheme capable of maintaining a low PAPR value is suitable for UL transmission. Accordingly, the current 3GPP LTE system has used the SC-FDMA capable of maintaining low PAPR as a UL transmission scheme.

Figure 5:
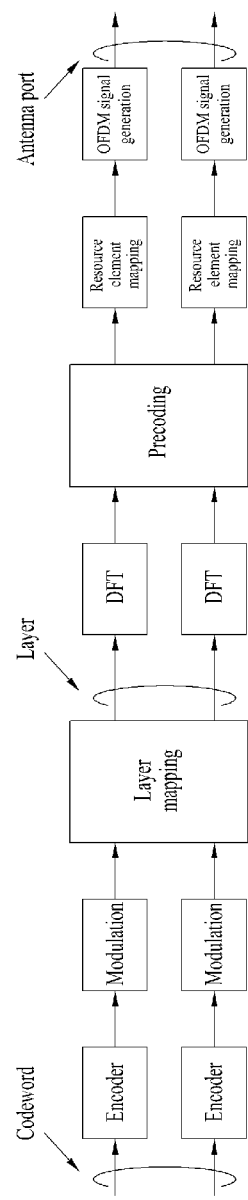
FIG. 5 illustrates an uplink data transmission procedure of the 3GPP LTE/LTE-A system.

FIG. 5 is a block diagram for explaining a DFT-s-OFDMA (or SC-FDMA) scheme for LTE uplink.

One or more codewords encoded by an encoder can be scrambled using a UE-specific scrambling signal. The scrambled codewords are modulated to complex symbols using a BPSK, QPSK, 16 QAM or 64 QAM scheme depending on the type of a transmitted signal and/or a channel state. Thereafter, the modulated complex symbols are mapped to one or more layers.

Although one codeword may be mapped to one layer on a symbol basis, one codeword can be distributedly mapped to up to four layers. If one codeword is distributedly mapped to a plurality of layers, symbols included in each codeword may be sequentially mapped to the layers and then transmitted. In a single-codeword transmission configuration, only one encoder and one modulation block can be used.

In addition, transform precoding can be applied to layer-mapped signals. Specifically, Discrete Fourier Transform (DFT) based precoding may be applied to the layer-mapped signals. The layer-mapped signals are multiplied by a pre-determined precoding matrix selected based on the channel state and then allocated to transmission antennas. Thereafter, the per-antenna transmitted signals are mapped to time-frequency resource elements to be used for transmission and then transmitted via the individual antennas after passing through an OFDM signal generator.

New RAT

To satisfy the low-latency requirement among new RAT performance requirements, a new subframe needs to be designed.

[Self-Contained Subframe]

Figure 6:
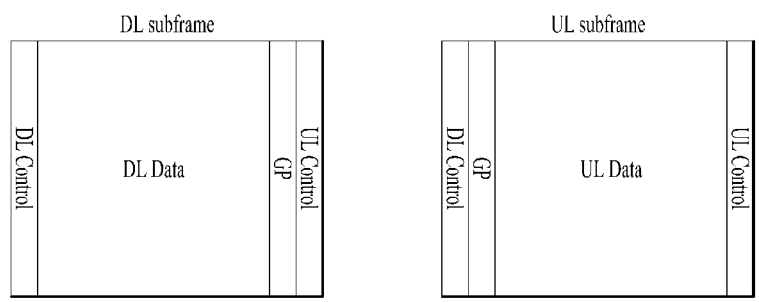
FIG. 6 illustrates the structure of a self-contained subframe according to an embodiment of the present disclosure.
Figure 7:
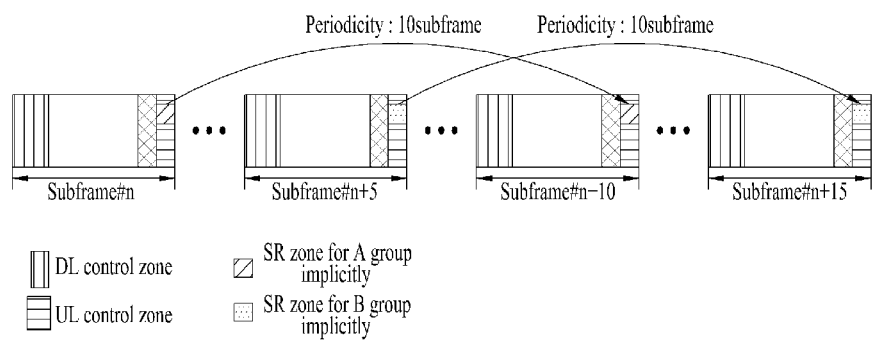
FIG. 7 shows an example of SR time and frequency transmission regions according to an existing method operated in LTE.
Figure 8:
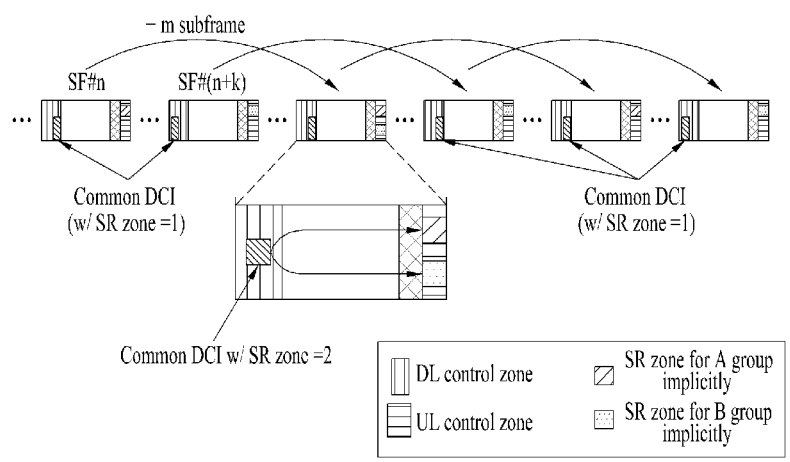
FIG. 8 illustrates an example of a method for extending the SR time and frequency transmission regions through a field related to the SR zone in common DCI.
Figure 9:
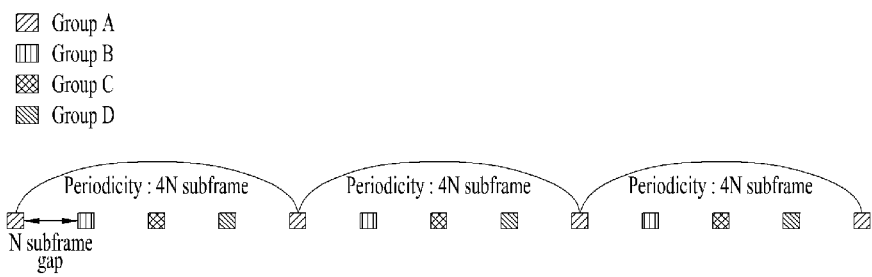
FIG. 9 illustrates an example in which there is a gap of N SFs between groups and a periodicity per group is 4N SFs.
Figure 10:
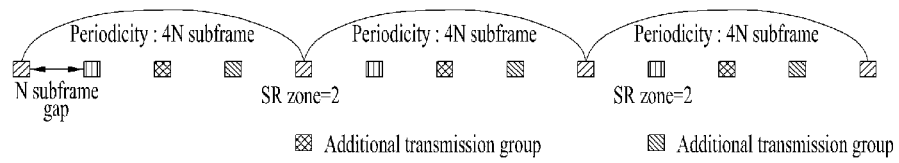
FIG. 10 illustrates an example of allocation of an additional SR region when the value of the SR zone is 2.
Figure 11:
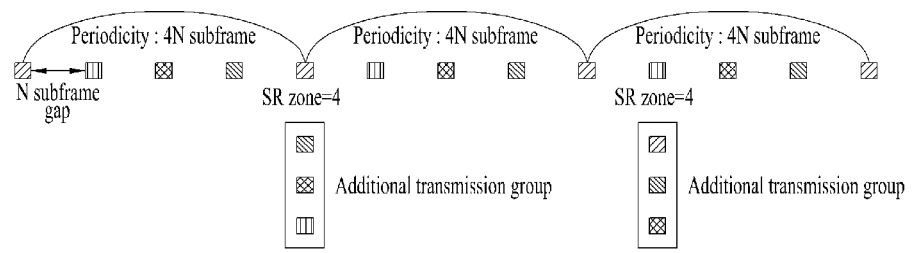
FIG. 11 illustrates another example of allocation of an additional SR region.
Figure 12:
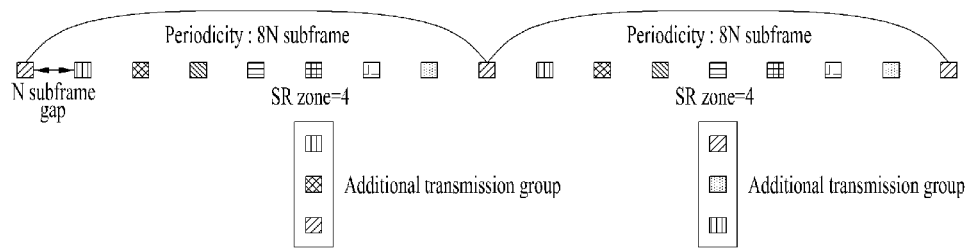
FIG. 12 illustrates an example of allocation of an additional SR region when the group transmission periodicity is 8N and the value of the SR zone is 4.
Figure 13:
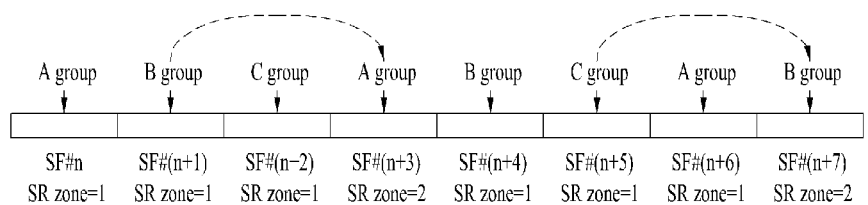
FIG. 13 illustrates another example of additional allocation of SR resource transmission when SR zone=2.
Figure 14:
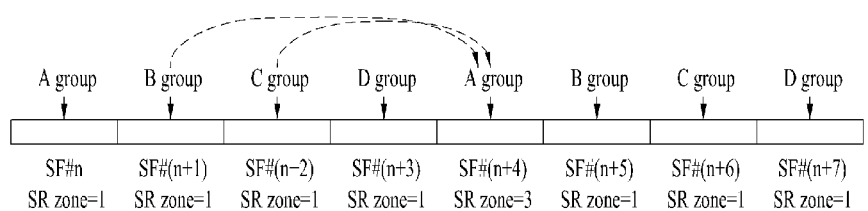
FIG. 14 illustrates an example of additional allocation of SR resource transmission when SR zone=3.

FIG. 6 illustrates a self-contained subframe proposed for the new RAT system. In the following description, the self-contained subframe can be referred to as a subframe for simplicity.

According to a TDD-based self-contained subframe structure, both a resource region for DL and a resource region for UL (e.g., DL and UL control channels) exist in one subframe.

Although FIG. 6 shows the structure of the self-contained subframe where the subframe is composed in the following order: DL control region—data region—UL control region, the present disclosure is not limited thereto. For example, as another self-contained subframe structure, a subframe may be composed in the following order: DL control region—UL control region—data region.

The self-contained subframe can be classified as either a DL self-contained subframe or a UL self-contained subframe depending on the direction of data transmission in the corresponding subframe.

This self-contained subframe structure requires a time gap that allows an eNB and a UE to switch a transmission mode to a reception mode and vice versa. To this end, at least one OFDM symbol on which DL-to-UL switching is performed is set as a guard period (GP) in the self-contained subframe structure. The GP is located at the time when the DL-to-UL switching is performed. For example, in a DL subframe, the GP is located between a DL data region and a UL control region, and in a UL subframe, the GP is located between a DL control region and a UL data region.

Meanwhile, one subframe can be defined to have constant time duration. For example, in the New RAT (NR) system, the time duration of one subframe may be fixed to 1 ms. In this case, since the duration of one symbol is determined by subcarrier spacing, the number of symbols included in one subframe may also be determined by the subcarrier spacing. For example, if subcarrier spacing is 15 kHz, 14 symbols may be included in one subframe. However, if the subcarrier spacing doubles, that is, increases to 30 kHz, the duration of one symbol decreases by half. Thus, a total of 28 symbols may be included in one subframe. Generally, subcarrier spacing of $15\ kHz*2^n$ can be used, and thus a total of $14*2^n$ symbols can be included in one subframe, where n is an integer such as 0, 1, 2, . . . , but n may not be necessarily a positive integer. For instance, if n is a negative integer, −1, a total of 7 symbols are included in one subframe.

[Contention Based Data Transmission with SR]

Contention based (CB) data transmission may reduce signaling overhead and latency compared to contention free (CF) or grant-based data transmission. On the other hand, if the packet arrival rate (PAR) is high, the probability of collision may be high, which may result in frequent occurrence of retransmission. Thereby, CB data transmission may become less efficient than CF data transmission. Therefore, an optimized technique is needed considering various factors such as PAR, packet size, number of UEs, and resource size/periodicity of a contention zone.

The proposed techniques may be classified as follows.
Grant-based transmission with user-wise SR
CB transmission with user-wise SR
CB transmission with group-wise SR
CB transmission without SR In the following description, multi-access (MA) signature is information used to distinguish between multiple users and may refer to a codebook/codeword/sequence/interleaver/mapping pattern or include a preamble/RS.

[Proposal #1] Grant-Based Transmission with User-Wise SR

A UE transmits an SR on an allocated SR resource. The BS may configure the SR resource of the UE through RRC or higher signaling.

If the SR transmitted by a UE is successfully received by the BS, the BS transmits an UL grant to the UE. The UL grant may be delivered over DCI. The UE performs UL transmission according to an indication of the grant. For example, the UL grant may include only the position of a data transmission resource and an MA signature. The BS may feed an ACK/NACK for UL transmission of the UE back to the UE. When a NACK for the UL transmission of the UE is fed back, the BS retransmits the UL grant. In this case, the UE may perform retransmission, and the BS may perform HARQ combining.

In the UL grant, a data transmission resource position represents a position in time/frequency, which indicates a position of a subframe and an RB in which the UE should perform transmission. Alternatively, a data transmission resource position may be represented by a time index such as a slot/symbol and a frequency index such as a subcarrier/sub-RB. For example, 1024 subframes may be specified using 10 bits of a time position field.

Alternatively, semi-persistent (SP) resources may be utilized as data transmission resources. For example, the transmission position may be determined by setting the time position field to 10 bits and the SP resource periodicity to 10 subframes. For example, the time position field=5 may indicate transmission after 50 subframes. The BS may announce the periodicity of SP resources by RRC or higher layer signaling. According to the SP resource utilization method, data transmission of the UE may be scattered in the time domain with DL/UL flexibility maintained.

If the BS fails to receive an SR transmitted by the UE, the BS may not transmit any information to the UE. If the UE does not receive the UL grant information for a specific time (a period set by the RRC or higher signaling in the system or a predefined period), the UE re-performs the SR transmission.

The UE may fail to receive a UL grant transmitted by the BS. In other words, if the UE does not receive UL grant information for a specific time (a period set by the RRC or higher signaling in the system or a predefined period), the UE re-performs the SR transmission.

[Proposal #2] CB Transmission with User-Wise SR

The UE transmits the SR on the allocated SR resource while transmitting data in a CB resource region. The BS may configure the SR resource region and the CB resource region for the UE through RRC or higher signaling. CB resources are a predefined resource region. The UE may select an MA signature that the UE uses in transmitting data in the CB resource region at random (or according to a predefined UE specific selection method).

If data transmitted by a UE is successfully received by the BS, the BS feeds back an ACK to the UE. The ACK may be delivered through DCI.

If the data transmitted by the UE fails to be received by the BS, the BS feeds NACK back to the UE. Here, while feeding the NACK back, the BS transmits a UL grant to the UE. The UE performs transmission according to the indication of the grant. The grant may contain only a data transmission resource position and an MA signature. The BS may perform HARQ combining through retransmission.

If the UE does not receive any ACK/NACK within a predetermined time after transmitting data, the UE re-attempts the transmission procedure of the SR and the data.

[Proposal #3] CB Transmission with Group-Wise SR

The UE transmits a group-wise SR on an allocated group-wise SR resource while transmitting the data in the CB resource region at the same time. The BS may configure an SR group resource of the UE by RRC or higher signaling. Accordingly, UEs in the same group may transmit the same resource and the same SR. The CB resources are a predefined resource region. The UE may randomly select the MA signature that the UE uses in transmitting data on the CB resource region.

Thereafter, the UE monitors both UE-wise ACK and group-wise NACK.

If the BS succeeds in receiving the data transmitted by the UE, the BS feeds the ACK back to the UE. The ACK may be delivered through the DCI.

If the BS fails to receive data transmitted by the UE, the BS feeds a group NACK back to the corresponding group. Here, the group feedback zone may be monitored by all UEs belonging to the group. Upon receiving feedback of the group NACK, the UEs belonging to the group re-attempts the transmission procedure of the group-wise SR and the data, recognizing that the data thereof is failed.

If UE-wise ACK and group-wise feedback NACK are obtained, this means that transmission of the data of the UE is successful, and thus the UE does not perform retransmission.

If the UE does not receive any ACK/NACK within a certain time after transmitting data, the UE re-attempts the transmission procedure of the group-wise SR and the data.

The mapping rule between the group-wise SR and the CB resources is as follows. The relationship between groups and CB resources satisfies M:K. That is, M groups may perform transmission on one CB resource. This relationship may be configured by the BS by RRC or higher layer signal. For example, when K is 1, the BS only needs to blindly detect CB resources corresponding to a group after SR detection because multiple groups access on one CB resource. On the other hand, if K is greater than 2, the number of candidates of CB resources on which the corresponding group may perform transmission after the SR detection increases, and thus the burden of blind detection and on the BS is increased. However, collisions may be reduced.

Therefore, if group or UE-wise SR detection fails, the BS does not need to perform blind detection (BD) on the connected CB-zone.

In the case where multiple groups are tied to one CB-Zone and the MA signature is distinguished by groups, the BS may perform BD only on the MA signature distinguished in the corresponding CB zone in detecting energy of a specific group SR. Additionally, scrambling corresponding to the UE ID may be performed upon blind detection.

[Proposal #4] CB Transmission without SR

The UE transmits data in the CB resource region. CB resources are a predefined resource region. The UE may randomly select an MA signature that the UE uses in transmitting data in the CB resource region.

A UE may add a preamble before data in transmitting the data.

The preamble may have a specific pattern. For example, p1, p2, and p3 are respectively associated with retransmission data. In other words, p1 indicates a first transmission, p2 indicates a first retransmission, and p3 indicates a second retransmission.

Alternatively, the preamble may indicate retransmission and repetition. For example, transmitting a preamble in p1 p1 p2 p2 means repeating performing the first transmission twice (e.g., p1, p1) and repeating the first retransmission twice (e.g., p2, p2). Here, the difference between the retransmission and the repetition is that the retransmission has different redundancy values (RVs) and the repetition maintains the same RV value.

In this case, the BS is capable of combining the HARQ combing and the repetition gain appropriately and controlling a soft buffer.

The preamble pattern may be predefined and the BS may announce the same by RRC or higher layer signaling. Alternatively, the UE may randomly select a preamble pattern in a predefined set. Selection of a preamble may be associated with a UE ID (e.g., RNTI).

Figure 17:
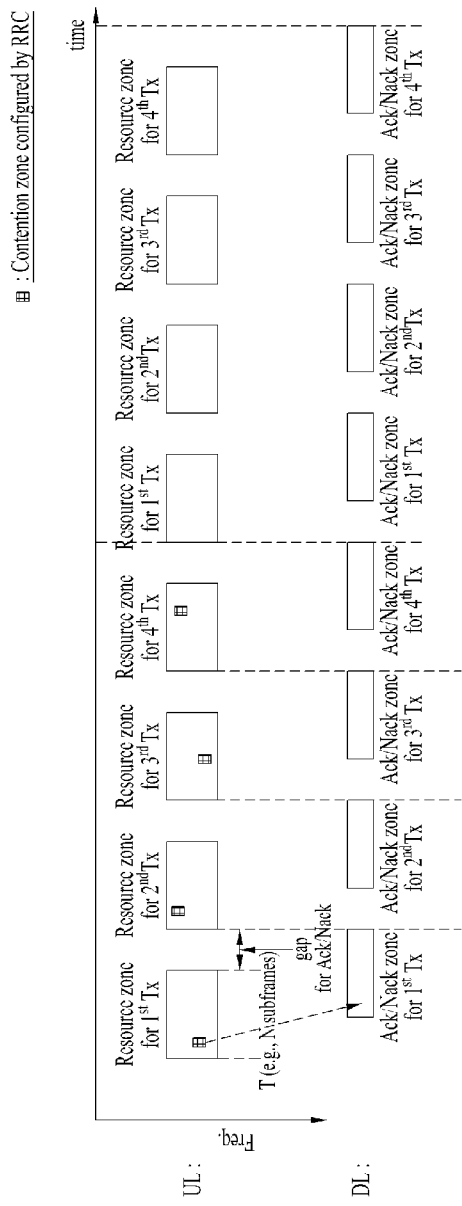
FIG. 17 illustrates an overall procedure for retransmission in a CB data transmission scenario.

FIG. 17 illustrates an overall procedure for retransmission in a CB data transmission scenario.

Figure 18:
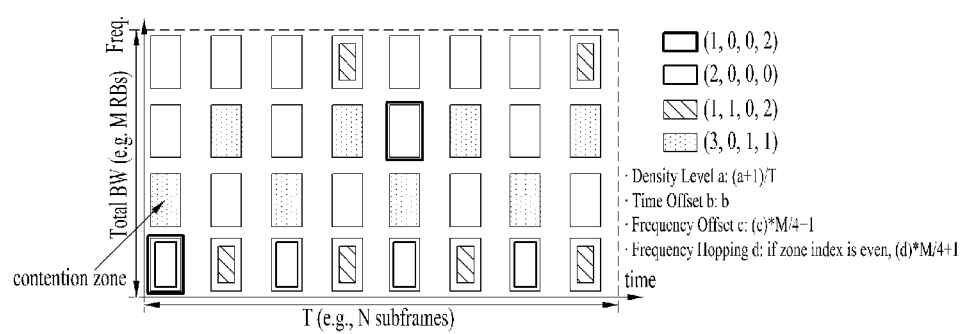
FIG. 18 illustrates an example of configuration of a resource zone composed of multiple contention zones.

FIG. 18 illustrates an example of configuration of a resource zone composed of multiple contention zones.

As shown in FIG. 18, the resource zone is composed of multiple contention zones, and each of the UEs may recognize, through RRC or higher layer signaling, a contention zone in which the UE is allowed to perform transmission. The resource zone is distinguished by the sequential position of the retransmission. That is, the UE may recognize whether the resource zone is for the 1st transmission or for the 2nd transmission through the RRC or system information (e.g., MIB, SIB). Accordingly, the UE may perform transmission in a contention zone allocated thereto in the corresponding resource zone according to the sequential position of the retransmission.

Hereinafter, a transmission technique utilizing UE-wise (or UE-specific) SR (U-SR) and group-wise SR (G-SR) is proposed.

First, a technique for switching between CB data transmission and scheduling transmission in a UE will be described.

[Proposal #5] a Technique for Switching Between CB Data Transmission and Scheduling Transmission in the UE The BS may inform each UE of a data transmission mode through RRC or higher layer information. The UE performs different transmission procedures according to the modes. Here, the transmission modes are divided into two types. Mode 0 is a CB transmission mode in which a UE is allowed to transmit a U-SR while transmitting CB data in a contention zone allocated to the UE. On the other hand, in Mode 1, the U-SR is transmitted, a UL grant is received, and transmission is performed in a scheduled data zone instead of a contention zone. The BS may cause a UE to transmit scheduled data even during operation in Mode 0 by transmitting a UL grant to the UE.

A transmission procedure in a specific mode will be described in detail from the perspective of a UE.

A UE configured in Mode 0 attempts to transmit a U-SR on a U-SR resource allocated thereto when UL data is generated Immediately thereafter, the UE transmits the UL data in a contention zone in the first resource zone. As mentioned above, the contention zone of each resource zone is pre-known by RRC signaling or the like. Thereafter, the UE repeats M transmissions in the same way. The UE monitors ACK/NACK zone during the M+1 transmissions. Thereby, the UE does not perform additional transmission anymore from the time at which the UE receives an ACK for the UL data of the UE.

If a UL grant is received during monitoring of a UL grant in the DCI region, the UE stops further CB data transmission and attempts transmission on a scheduled data resource.

Also, even if the UE does not receive a NACK for the corresponding transmission, the UE attempts retransmission according to the RV value allocated to the resource zone. In addition, if the NACK is not received until the last retransmission, the UE may increase the power from the next initial transmission, considering that the NACK has not been received due to power shortage. If NACK is received in the last retransmission, the UE performs CB data transmission at the same power.

When the BS transmits a feedback ACK/NACK in the last M+1-th transmission, the BS may transmit the same at power that is twice the existing ACK/NACK transmission power in order to guarantee detection performance. Alternatively, the BS may double the power by doubling the allocated tone of the ACK/NACK sequence. In this case, if the ACK/NACK is the last ACK/NACK, it consists of three kinds of information. It consists of a first ACK, a second NACK, and power ramping triggering. An appropriate modulation scheme may be used for performance. For example, a modulation scheme in which −1 indicates NACK, 0 indicates power ramping triggering, and 1 indicates ACK may be used.

In Mode 1, the UE attempts to transmit a U-SR on a U-SR resource allocated thereto when UL data is generated. Then, after receiving the UL grant from the BS through the DCI, the UE performs transmission on a scheduled data resource. That is, the UE does not perform CB data transmission.

Figure 19:
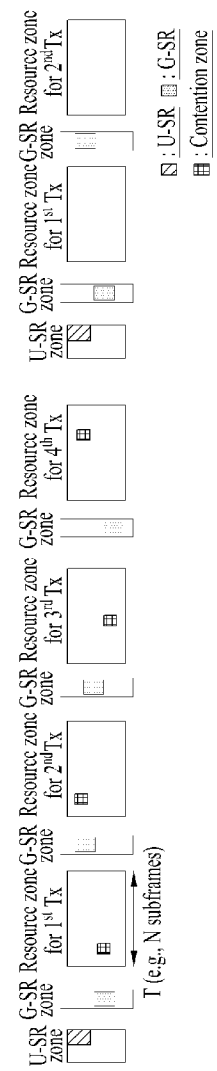
FIG. 19 illustrates an example in the case of Mode 0.

FIG. 19 illustrates an example in the case of Mode 0.

The following procedure is performed on the BS side.

When the BS checks the energy on the U-SR resource and confirms that the U-SR is received, the BS operates according to the mode of the corresponding UE. If the mode of the corresponding UE is mode 0, the BS decodes the data received in the corresponding contention zone. It may also perform combining for retransmission. The BS transmits an ACK to the UE at the moment of successful decoding. Also, even if the decoding fails for each of the M+1 retransmissions, the BS may not transmit the NACK for the corresponding retransmissions. That is, the NACK is transmitted if decoding fails even for the last retransmission. In addition, the BS may transmit a UL grant to the UE even during a retransmission.

On the other hand, in Mode 1, the BS allocates a scheduled data zone to the UE.

Hereinafter, a technique for CB data transmission using G-SR is disclosed.

In Proposal #5, if UL data is generated after the transmission time of the U-SR, it should wait until the next U-SR transmission time. This operation does not raise any serious issue in the scenario of mMTC because the delay constraint can be mitigated. However, in case of a UE of URLLC, a tight delay constraint needs to be satisfied, and accordingly an additional technique is needed.

[Proposal #6] a Technique for CB Data Transmission Using G-SR

The UE may transmit a G-SR in the G-SR zone and transmit CB data even after the U-SR transmission occasion.

Hereinafter, the procedure for the UE will be described in detail.

When UL data is generated after a transmission occasion of the U-SR, the UE may transmit an SR (or group-wise preamble) in an allocated G-SR zone and then start transmission in the resource zone.

Figure 20:
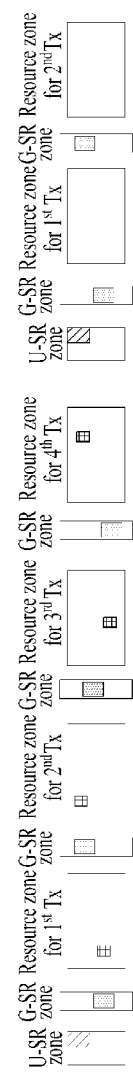
FIG. 20 illustrates an example of G-SR based CB data transmission.

FIG. 20 illustrates an example of G-SR based CB data transmission. Specifically, FIG. 20 shows an example in which UL data is generated after the U-SR zone and transmission starts from the 3rd resource zone.

If ACK is not received even in the 4th resource zone, the UE transmits an SR in the U-SR zone and operates as in Proposal #5. In this case, for the group-SR case, the NACK cannot be transmitted because the BS does not recognize the UE correctly.

In this case, the retransmission RV value may be set to an RV value used in the m-th resource zone.

If energy is detected during monitoring of the G-SR zone, the BS attempts to additionally detect contention zones assigned to UEs corresponding to a group. If the detection is successful, the BS transmits an ACK to the UE. On the other hand, if the detection fails, the UE cannot be identified, and thus the BS does not transmit any signal or transmits a group NACK.

In this case, the blind detection complexity of the BS may be lowered, and the latency may be reduced in the URLLC scenario.

In the method illustrated in FIG. 17, all UEs recognize resources in the same manner from the first transmission to the last retransmission. In other words, the first transmission resource configured for or known by one UE is recognized as a resource for the first transmission by the other UEs in the same manner. For convenience of explanation, the scheme above is referred to as a non-staggering method below.

In the case where many UEs attempt to perform transmission at the same time through the non-staggering mode, while the UEs perform transmission as many times as the number of retransmissions, UEs having new traffic generated therefor delays transmission until the first transmission allowed resource time of the next cycle. Accordingly, non-staggering is a method more robust to burst traffic by reducing the probability of collision in case of burst.

Non-staggering may reduce BD for obtaining combining gain for retransmission.

On the other hand, according to non-staggering, traffic generated in the corresponding retransmission window interval should be transmitted after waiting until the first transmission allowed time of the next cycle, and accordingly transmission delay occurs. Nevertheless, such transmission may be considered appropriate if a requirement for transmission delay, such as mMTC, is not large.

As another retransmission scheme, a scheme having a UE specific retransmission period may be considered. This scheme is referred to as a staggering mode.

Figure 21:
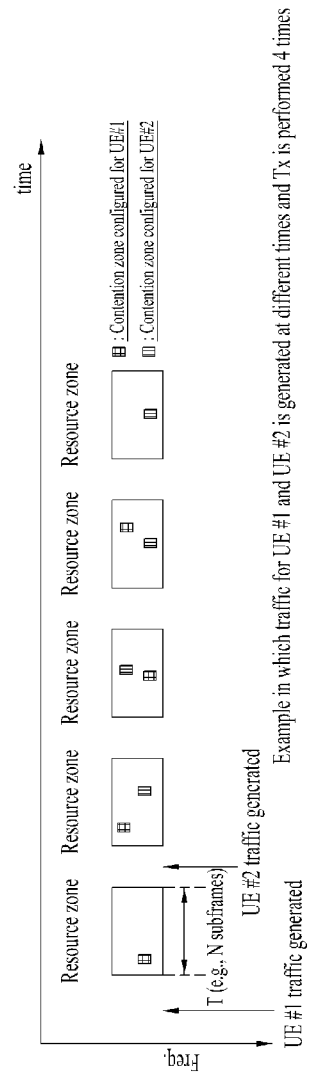
FIG. 21 illustrates an example of transmission of two UEs when traffic occurs at different points in time.

FIG. 21 shows an example of transmission when traffic occurs at different points in time at two UEs.

As shown in FIG. 21, in contrast with the non-staggering mode, in the staggering mode, the UE starts transmission on a resource allocated (by the RRC) immediately after the time when the traffic is generated. Accordingly, in the staggering mode, the transmission occasion is given as soon as traffic is generated, and therefore the transmission delay is not large.

On the other hand, compared to the non-staggering mode, the staggering mode may increase the collision probability when burst traffic is generated. In the case of the staggering mode, the BD complexity increases when combining for retransmission is performed.

The staggering mode may operate properly in a situation where the requirement for transmission delay is high, like URLLC, and the number of UEs is not large.

As an example of the present disclosure, a UE/BS operation and procedure for the non-staggering and staggering modes are proposed as follows.

The BS may inform UEs of the non-staggering mode and the staggering mode through a field of a higher layer signal such as RRC or common DCI. For example, the common DCI may indicate non-staggering and staggering via a toggling field.

The UEs operate according to the scheme configured by the BS as follows. In the staggering mode, the UE may attempt transmission on a contention resource allocated thereto on an adjacent resource immediately after the traffic is generated. In the non-staggering mode, the UE waits until the first transmission resource time after the traffic is generated, and then attempts transmission on the contention resource allocated thereto.

The UE may operate according to the value of the field as shown in Table 1.

TABLE 1

| Field | Value | Operation |
| --- | --- | --- |
| Toggling field | 0 or 1 | 0: staggering, 1: non-staggering |
| Retransmission window size in resource config. | 1~maxWindowsize | Maximum value of retransmission resource in the non-staggering mode. The number of times of reTx that the UE can perform in the staggering mode |
| Max ReTx in RRC for UE | None or 2~max of reTx | Valid only in the staggering mode. Not valid in the non-staggering mode. |

In the staggering mode, when a value of the retransmission window size in resource config. and a value of the Max ReTx in RRC for UE are present at the same time, the UE uses the value of the Max ReTx in RRC for UE. For example, the value of reTx may differ among the UEs.

(i) Switching from the Non-Staggering Mode to the Staggering Mode

For example, the UEs start transmission, determining the staggering mode from the first transmission allowed resource after the last non-staggering retransmission resource. Specifically, when resources are configured for transmissions up to the fourth transmission as shown in FIG. 17, the UEs start transmission, determining that the mode is the staggering mode from the first transmission time after the mode switching signaling is received.

In another example, the UEs start transmission, determining that the mode is the staggering mode from the first transmission allowed resource that follows n transmissions after mode switching signaling (e.g., common DCI). Even a UE for which retransmission is not completed within n times stops retransmission and starts the first transmission on the first resource of the staggering mode. For example, if the redundancy value (RV) is determined by the number of transmissions, transmission is performed according to the corresponding rule.

(ii) Switching from the Non-Staggering Mode to the Staggering Mode

The UEs start transmission, determining that the resource that follows n transmissions after the mode switching signaling (e.g., common DCI) is the first resource of the non-staggering mode. Even a UE for which retransmission is not completed within n times stops retransmission and starts the first transmission on the first resource of the non-staggering mode. For example, if the RV is determined by the number of transmissions, transmission is performed according to the corresponding rule.

Figure 22:
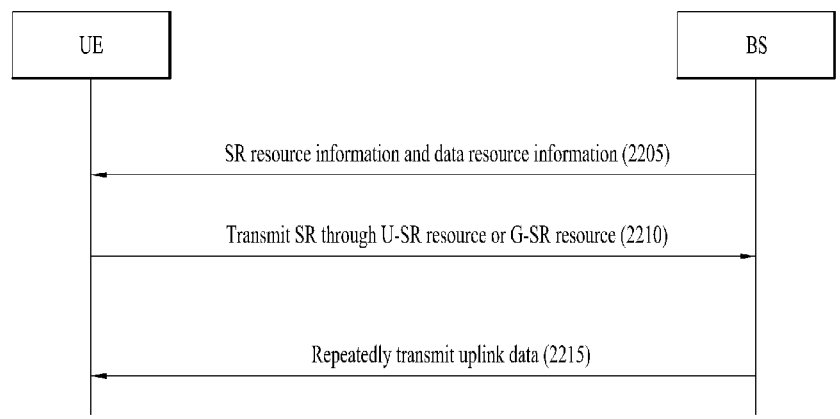
FIG. 22 is a flowchart illustrating an uplink signal transmission and reception method between a user equipment and a base station according to an embodiment of the present disclosure.

FIG. 22 is a flowchart illustrating an uplink signal transmission and reception method between a user equipment and a base station according to an embodiment of the present disclosure.

The UE receives scheduling request (SR) resource information and data resource information from the BS (2205).

The UE transmits an SR through any one of a UE-wise SR resource and a group-wise SR resource allocated through the SR resource information (2210).

The UE repeatedly transmits uplink data through multiple resource zones allocated through the data resource information (step 2215).

One UE-wise SR resource may be allocated to each resource zone set including N resource zones, and at least one group-wise SR resource may be allocated to each of the resource zones.

The UE may select one of the UE-wise SR resource and the group-wise SR resource based on the time at which the uplink data is generated.

When the UE selects the UE-wise SR resource and transmits the SR, the UE may start repeated transmission of the data from the start point of the one resource zone set.

When the UE selects the group-wise SR resource and transmits the SR, the UE may start repeated transmission of the data from a resource zone associated with the group-wise SR resource on which the SR is transmitted in the one resource zone set.

The UE may receive, from the BS, information indicating one of the non-staggering mode, in which the start and end times of the repeated transmission are matched with the start and end times of the one resource zone set, and the staggering mode, in which the start and end times of the repeated transmission do not need to be matched with the start and end times of the one resource zone set.

According to the non-staggering mode, the start and end times of the repeated transmission of the UE may be configured to be the same as those of the other UEs. According to the staggering mode, the start and end times of the repeated transmission of the UE may be configured independently from those of the other UEs.

Figure 23:
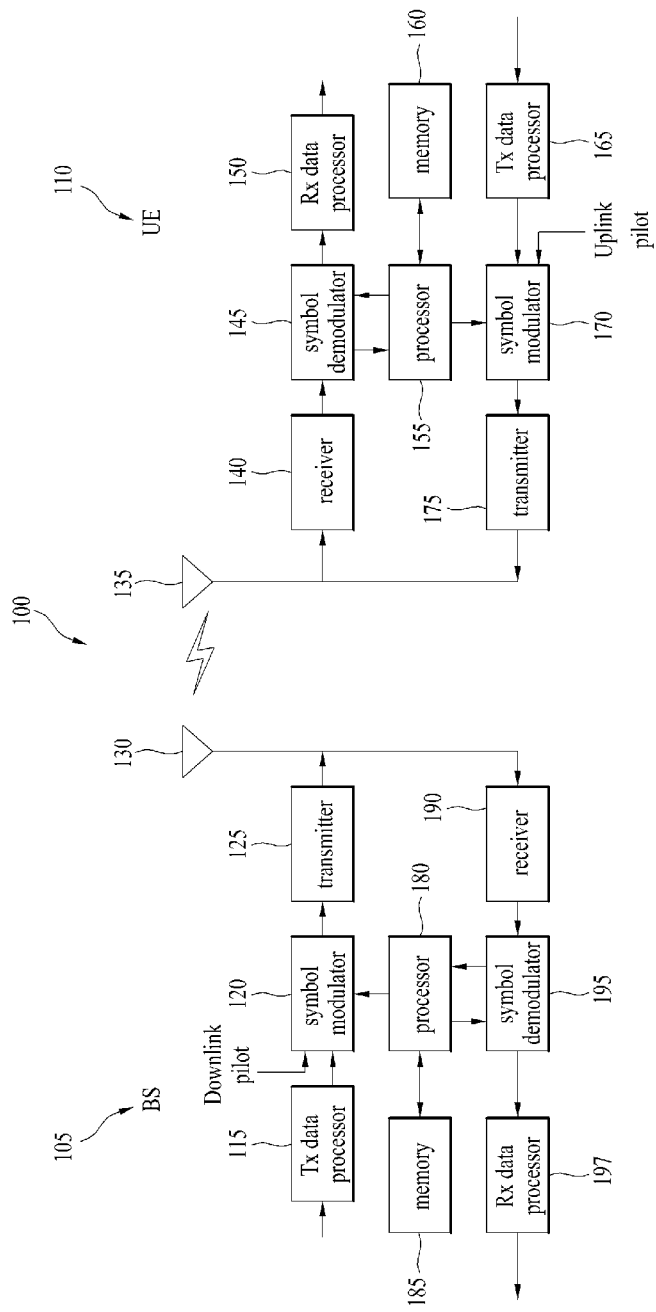
FIG. 23 illustrates a user equipment and a base station according to an embodiment of the present disclosure.

FIG. 23 is a block diagram for configurations of an eNB 105 and a user equipment 110 in a wireless communication system 100.

Although one eNB 105 and one user equipment 110 (D2D user equipment included) are shown in the drawing to schematically represent a wireless communication system 100, the wireless communication system 100 may include at least one eNB and/or at least one user equipment.

Figure 15:
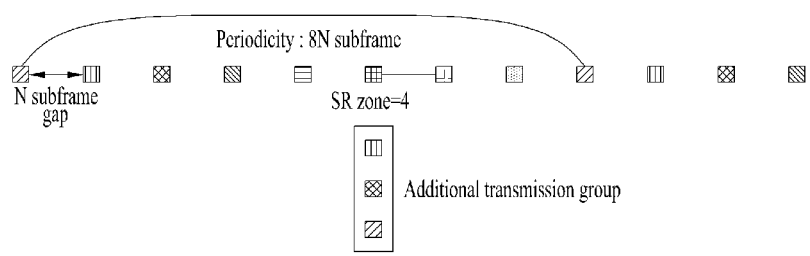
FIG. 15 illustrates an example of allocation of an additional SR area when the group transmission period is 8N and the value of the SR zone is 4.
Figure 16:
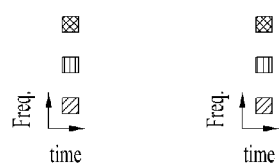
FIG. 16 illustrates an example of a frequency domain allocation scheme in FIG. 15.

Referring to FIG. 15, an eNB 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the eNB/user equipment 105/110 includes one antenna 130/135 in the drawing, each of the eNB 105 and the user equipment 110 includes a plurality of antennas. Therefore, each of the eNB 105 and the user equipment 110 of the present disclosure supports an MIMO (multiple input multiple output) system. And, the eNB 105 according to the present disclosure may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the eNB and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the eNB 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/eNB 110/105 directs operations (e.g., control, adjustment, management, etc.) of the user equipment/eNB 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/eNB and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and an eNB may be able to exchange RRC messages with each other through a wireless communication network and RRC layers.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the invention. Thus, it is intended that the present disclosure covers the modifications and variations of this invention that come within the scope of the appended claims and their equivalents.

INDUSTRIAL APPLICABILITY

The embodiments of the present disclosure mentioned in the foregoing description are applicable to various kinds of mobile communication systems.

The invention claimed is:

1. A method for transmitting an uplink signal by a user equipment (UE) in a wireless communication system, the method comprising:
receiving scheduling request (SR) resource information and data resource information from a base station, wherein the SR resource information comprises UE-wise SR resource allocation information and group-wise SR resource allocation information;
selecting a UE-wise SR resource for transmission of an SR;
transmitting the SR through the selected UE-wise SR resource allocated through the SR resource information; and
repeatedly transmitting uplink data through a plurality of resource zones allocated through the data resource information,
wherein a resource zone set includes N (N is a natural number) resource zones having different locations in the time domain,
wherein only one UE-wise SR resource is allocated to a resource zone set, and at least one group-wise SR resource is allocated to each of the N resource zones, and
wherein the repeated transmission of the data starts from a start time of the resource zone set based on the selection of the UE-wise SR resource.

2. The method of claim 1, wherein the UE selects the UE-wise SR resource based on a time when the uplink data is generated.

3. The method of claim 1, further comprising:
receiving, from the base station, information indicating one of a non-staggering mode and a staggering mode, wherein start and end times of the repeated transmission are matched with start and end times of the resource zone set in the non-staggering mode, and do not match the start and end times of the resource zone set in the staggering mode.

4. The method of claim 3,
wherein, the start and end times of the repeated transmission of the UE are configured to be the same as other UEs, and
wherein, according to the staggering mode, the start and end times of the repeated transmission of the UE are configured independently from the other UEs.

5. A method for receiving an uplink signal by a base station in a wireless communication system, the method comprising:
transmitting scheduling request (SR) resource information and data resource information to a user equipment (UE), wherein the SR resource information comprises UE-wise SR resource allocation information and group-wise SR resource allocation information;

receiving an SR through a UE-wise SR resource allocated through the SR resource information; and repeatedly receiving uplink data through a plurality of resource zones allocated through the data resource information, wherein a resource zone set includes N (N is a natural number) resource zones having different locations in time domain, wherein only one UE-wise SR resource is allocated to a resource zone set, and at least one group-wise SR resource is allocated to each of the N resource zones, and wherein the repeated reception of the data coincides with a start time of the resource zone set based on the use of the UE-wise SR resource.

6. The method of claim 5, wherein the UE-wise SR resource is selected based on a time when the uplink data is generated.

7. The method of claim 5, further comprising:

transmitting information indicating one of a non-staggering mode and a staggering mode, wherein start and end times of the repeated transmission are matched with start and end times of the resource zone set in the non-staggering mode, and do not match the start and end times of the resource zone set in the staggering mode.

8. The method of claim 7, wherein, the start and end times of the repeated transmission of the UE are configured to be the same as other UEs, and wherein, according to the staggering mode, the start and end times of the repeated transmission of the UE are configured independently from the other UEs.

9. A user equipment (UE) for transmitting an uplink signal in a wireless communication system, comprising:

a transmitter;

a receiver; and a processor configured to receive scheduling request (SR) resource information and data resource information from a base station using the receiver, wherein the SR resource information comprises UE-wise SR resource allocation information and group-wise SR resource allocation information, to select a UE-wise SR resource for transmission of an SR; to transmit the SR through the selected UE-wise SR resource allocated through the SR resource information using the transmitter, and to repeatedly transmit uplink data through a plurality of resource zones allocated through the data resource information using the transmitter, wherein a resource zone set includes N (N is a natural number) resource zones having different locations in time domain, wherein only one UE-wise SR resource is allocated to a resource zone set, and at least one group-wise SR resource is allocated to each of the N resource zones, and wherein the repeated transmission of the data starts from a start time of the resource zone set based on the selection of the UE-wise SR resource.

10. A base station for receiving an uplink signal in a wireless communication system, comprising:

a transmitter;

a receiver; and a processor configured to transmit scheduling request (SR) resource information and data resource information to a user equipment (UE) using the transmitter, wherein the SR resource information comprises UE-wise SR resource allocation information and group-wise SR resource allocation information, to receive an SR through a UE-wise SR resource allocated through the SR resource information using the receiver, and to repeatedly receive uplink data through a plurality of resource zones allocated through the data resource information, wherein a resource zone set includes N (N is a natural number) resource zones having different locations in time domain, wherein only one UE-wise SR resource is allocated to a resource zone set and at least one group-wise SR resource is allocated to each of the N resource zones, and wherein the repeated reception of the data coincides with a start time of the resource zone set based on the use of the UE-wise SR resource.

11. The UE according to claim 9, wherein the UE is capable of communicating with at least one of another UE, a UE related to an autonomous driving vehicle, a base station or a network.

* * * * *